Sept. 25, 1951　　　　　K. R. DANHOF　　　　　2,569,231
APPARATUS FOR MOLDING PRESTRESSED REINFORCED CONCRETE ELEMENTS
Filed June 5, 1950　　　　　　　　　　　　　　2 Sheets-Sheet 1
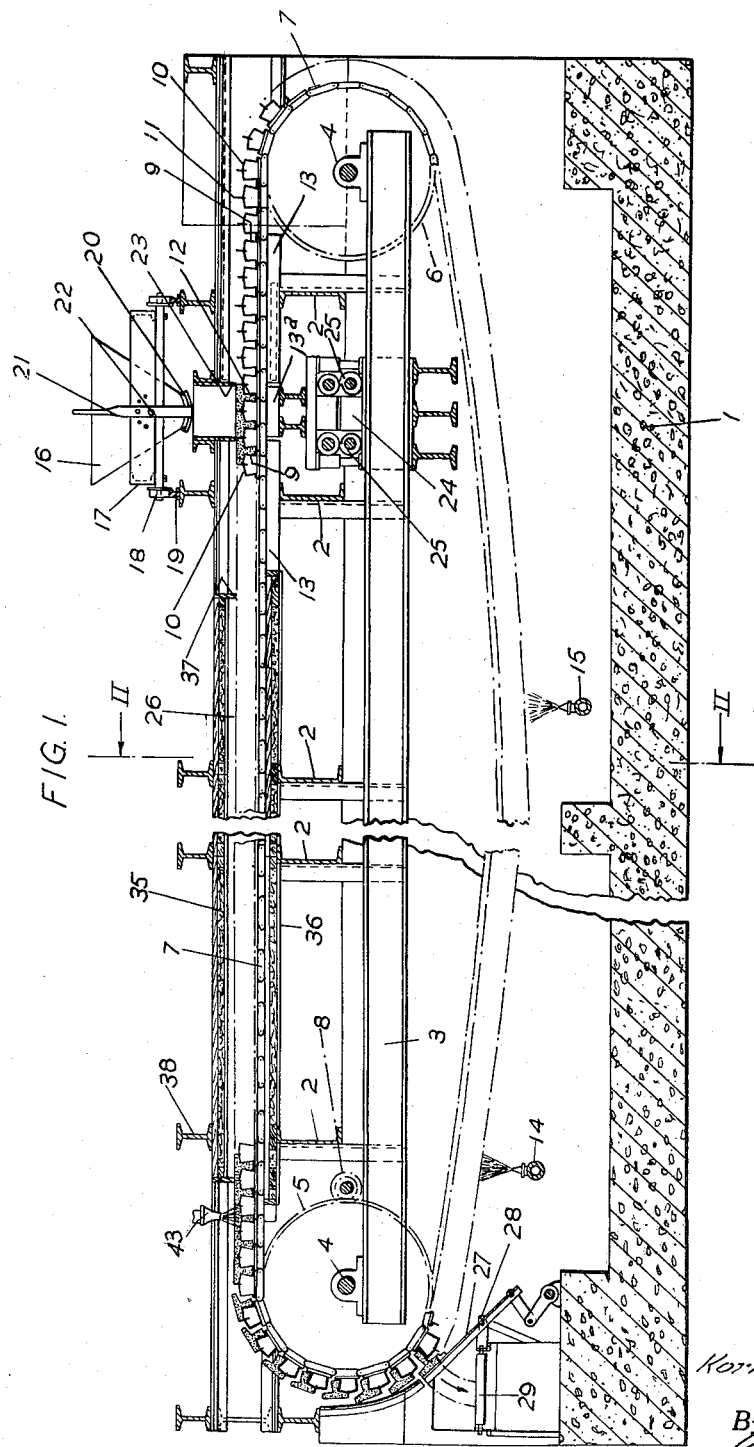
Inventor
Kornelis R. Danhof
By
Attorney

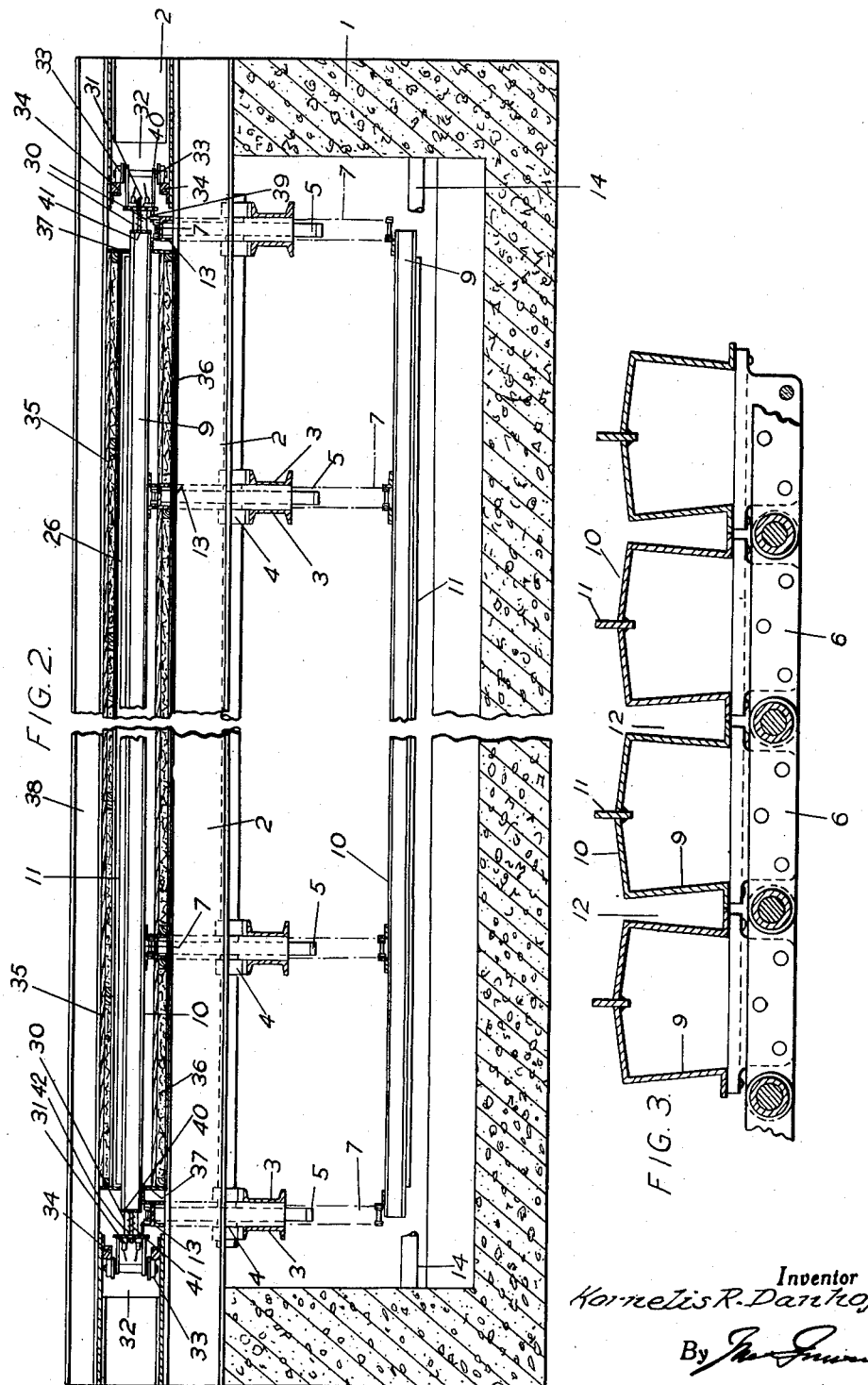

Patented Sept. 25, 1951

2,569,231

UNITED STATES PATENT OFFICE 2,569,231

APPARATUS FOR MOLDING PRESTRESSED REINFORCED CONCRETE ELEMENTS

Kornelis Reinhold Danhof, London, England, assignor to Concrete Patents Limited, London, England, a British company Application June 5, 1950, Serial No. 166,175
In Great Britain June 10, 1949

3 Claims. (Cl. 25—99)

1

This invention relates to apparatus for manufacturing prestressed concrete bars, slabs and the like.

The main object of the present invention is to achieve the mass production of prestressed concrete elements of usual cross section, for example square or T section, which may be of considerable length, for example 30 feet, the manner of production permitting the application of the principle of pre-stressing.

The reinforcing elements are threaded through the moulds and end walls thereof into trolleys wherein they are anchored, said trolleys being operatively associated with the moulds to travel therewith and guided by rails which diverge to stress the reinforcements to a predetermined degree, and then are parallel to the conveyor to maintain the stress until the curing operation is completed, the ends of the embedded reinforcing elements being separated from the trolleys prior to ejection of the product and end walls from the moulds.

Apparatus for manufacturing concrete elements constructed according to the present invention comprises an endless flexible conveyor carrying mould parts, each including a mould side wall, means for filling the molds and means for consolidating the concrete in the moulds, a steam curing zone through which the conveyor passes, the conveyor at the discharge end passing through an arc so as to separate the mould parts, and means for receiving the moulded elements as they slide from the moulds.

The apparatus preferably also comprises trolleys near the ends of the moulds, means for anchoring reinforcement elements passing through the moulds to the respective trolleys, said trolleys being operatively connected to the moulds to travel therewith during the moulding operation and ramps adapted to spread apart the pair of trolleys related to each mould to stress the reinforcements followed by parallel rails to maintain the stress during moulding.

In order that the invention may be more clearly understood, one preferred embodiment thereof as applied to the manufacture of concrete elements of T section will now be described by way of example with reference to the accompanying diagrammatic drawings.

In the drawings, Figure 1 is a sectional elevation of an installation for the continuous mass production of the elements, Figure 2 is a transverse sectional elevation on the line II—II of Figure 1, and Figure 3 is a detail to an enlarged scale more clearly showing the mould parts.

2

In the drawings like references designate similar parts.

On the side walls 1 of a foundation are rested at suitable intervals transverse girders 2 under which are mounted a series of pairs of longitudinal girders 3, which at each end support bearings 4 for sprockets 5 and 6, of large diameter for example, 4 feet diameter, disposed between each pair, the two sprockets 5 and 6, associated with each pair of girders 3, being connected by a chain 7 and each sprocket 5 with a driver pinion 8 so that the several chains are driven together at the same linear speed.

Transversely of the chains and connected to each are the mould parts of somewhat inverted U form and including side walls 9 of two adjacent moulds and an upper wall 10 carrying a central fin 11. The walls 9 are inclined so that opposed walls 9 contain a tapered section narrowing outwardly so that an element having the "T" crosssection indicated at 12 can be cast between each pair of mould parts.

Each upper run of the chains is supported on inverted channel members 13 carried on the girders 2, whilst the lower run moves freely past washing water jets 14 and mould oil jets 15.

Near the sprocket 6 is the filling station comprising a hopper 16 carried on a chassis 17 provided with wheels 18 which run on rails 19, the hopper having a gate 20 operable by a handle 21 pivoted at 22 on the hopper, so that the concrete can be deposited into a box 23 of a width to overlie two mould parts, the leading lower edge of the box acting as a strickling bar to level the tops of the sections 12.

Immediately below the box the chain supports may be divided to comprise an individual support 13a carried on a vibrator generally indicated at 24 so as to effect consolidation of the concrete in each mould. The number and type of such vibrators employed may vary, and one of the kind illustrated comprising rapidly driven snail cams 25 may be arranged centrally of the moulds to achieve satisfactory packing of the concrete in the moulds. Alternatively, consolidating machinery may be employed of the kind described and claimed in British Patent Specification No. 427,213, in which the cams, such as the cams 25 described herein, are driven at a speed of about 400 revolutions per minute.

The distance between the centres of the sprockets is about 35 feet and the speed of the conveyor about one inch per minute. As indicated at 26 a steam curing chamber is provided in the upper runs of the chains so that curing will be effected before the filled moulds reach the sprocket 5, the chamber being heated by blowing in low pressure steam by means of pipes (not shown).

As the moulds pass over the sprocket 5 the chains are so flexed as to open the side walls 9 of the mould parts fan-wise, so that the moulded elements are released from at least one of these walls and are free to slide from their moulds which they tend to do under the action of gravity as soon as they pass over the axis of the sprockets. The elements thus ejected are received on inclined bars 27 which tilt about the pivots 28 and lower the element on to a roller conveyor 29 between the rollers of which they pass to deposit the element on to the conveyor along which it may be pushed to stores.

By such form of apparatus, concrete elements may be continually produced in mass production. The section of the elements may be readily varied by changing the mould parts, for example if L shape parts are employed square or rectangular section elements may be produced.

When it is desired to produce pre-stressed elements, reinforcing wires suitably disposed in the moulds are passed through the removable end walls of the moulds.

The wires, two of which are indicated at 30 in Figure 2, pass through the end walls 40 and are anchored by known clamping means indicated at 31 to trolleys generally indicated at 32 which carry wheels 33 running on guiding rails 34. The bars 41 are slidably mounted on the trolleys 32 and carry the removable end walls 40, springs 42 urge the walls 40 against side walls 9. Rails 34 are divergent near the sprockets 6, for example in the first 4 feet diverge by 3 inches, to spread apart the trolleys at each end of a mould in order to progressively attain the desired and predetermined stress in the reinforcements.

The rails then run parallel with the chains along the filling station up to the end of the curing chamber to maintain the stress during moulding, and converge again somewhat beyond the curing chamber, so as to release the tension between the associated trolleys, and before the moulds reach the sprockets 5 the wires are severed by means of an acetylene torch diagrammatically shown at 43 between the moulds and the trolleys so as to free the moulded element and end walls of the mould and the trolleys from the moulds. The acetylene torch may be operated by hand or preferably automatically by one of the moving parts of the machine; alternatively, each wire may be severed by passing a large electric current through a short length of the wire.

Preferably, each trolley is long enough to take the wires extending from two or more adjacent moulds.

The steam chamber may as shown be boarded in top and bottom by boards 35, 36 arranged between end walls 37, the lower boards being supported on the girders 2 and the upper boards connected to overhead girders 38.

To operatively connect the trolleys with the moulds to travel therewith, the trolleys may be provided with arms 39 which are lodged in recesses in the links of the chain 7 so as to be readily released from the chain, removed from the rails and returned to the charging end after the reinforcements have been severed.

As will be well understood, each mould may be provided with a false bottom to reduce the height of the section and to increase the inner radius of the element so that separation of the side walls and the bottom of the element is assured. Alternatively, the same result may be achieved whilst retaining the height of the section by suitably increasing the height of the side walls.

By the present invention, a simple method of producing concrete elements which may be prestressed is achieved by apparatus which is easy to operate and not likely to get out of order.

I claim:

1. Apparatus for manufacturing prestressed reinforced concrete elements comprising a flexible endless conveyor, a series of mould parts hinged to said conveyor about parallel axes, means for filling in succession the moulds, the side walls of which are constituted by juxtaposed mould parts, a pair of trolleys spaced from the ends of each said mould, means for anchoring reinforcing elements through the moulds to the respective trolleys, said trolleys being operatively connected to said moulds to travel therewith during the moulding operation, and rails for said trolleys, which rails first diverge whereby said reinforcements are stressed and subsequently are parallel, whereby the stress is maintained during moulding, means for curing the concrete in the moulds, and means for moving said conveyor at right angles to said axes through a downward arc, whereby the mould parts are separated and the cured elements released from the moulds after the reinforcement has been severed between the end walls and the respective trolley.

2. Apparatus for manufacturing prestressed reinforced concrete elements comprising a flexible endless conveyor, a series of mould parts hinged to said conveyor about parallel axes, removable end walls connecting adjacent mould parts, means for filling in succession the moulds constituted by the mould parts and the end walls, a pair of trolleys spaced from the ends of each said mould, means for anchoring reinforcing elements through the moulds to the respective trolleys, said trolleys being operatively connected to said moulds to travel therewith during the moulding operation, and rails for said trolleys, which rails first diverge whereby said reinforcements are stressed and subsequently are parallel, whereby the stress is maintained during moulding, means for curing the concrete in the moulds, and means for guiding said conveyor through a downward arc at right angles to said axes, whereby the mould parts are separated and the cured elements released from the moulds after the reinforcement has been severed between the end walls and the respective trolley.

3. Apparatus for manufacturing prestressed reinforced concrete elements comprising a plurality of links forming a flexible endless conveyor, a series of mould parts, the mould parts of the said series being mounted in successive links of the conveyor, pairs of removable end walls respectively connecting adjacent mould parts, means for filling the moulds in succession, each mould being constituted by adjacent mould parts and a pair of removable end walls, a pair of trolleys spaced from the ends of each said mould, means for anchoring reinforcing elements through the moulds to the respective trolleys, said trolleys being operatively connected to said moulds to travel therewith during the moulding operation, and rails for said trolleys, which rails first diverge whereby said reinforcements are stressed and subsequently are parallel whereby the stress is maintained during moulding, a curing zone on the path of the conveyor, means for guiding said conveyor through a downward arc, whereby the mould parts are separated and the cured elements are released from the moulds after the reinforcement has been severed between the end walls and the respective trolley, and means for receiving the reinforced moulded elements as they slide from the moulds.

KORNELIS REINHOLD DANHOF.

REFERENCES CITED

The following references are of record in the file of this patent:

UNITED STATES PATENTS

| Number | Name | Date |
|---|---|---|
| 1,453,746 | Carey | May 1, 1923 |
| 1,602,172 | Ruby | Oct. 5, 1926 |
| 1,782,413 | Dietrichs | Nov. 25, 1930 |
| 1,803,408 | Rouse | May 5, 1931 |